No. 721,389. PATENTED FEB. 24, 1903.
M. REID.
MACHINE FOR MAKING TYPE BARS.
APPLICATION FILED JAN. 28, 1898.
NO MODEL. 3 SHEETS—SHEET 1.
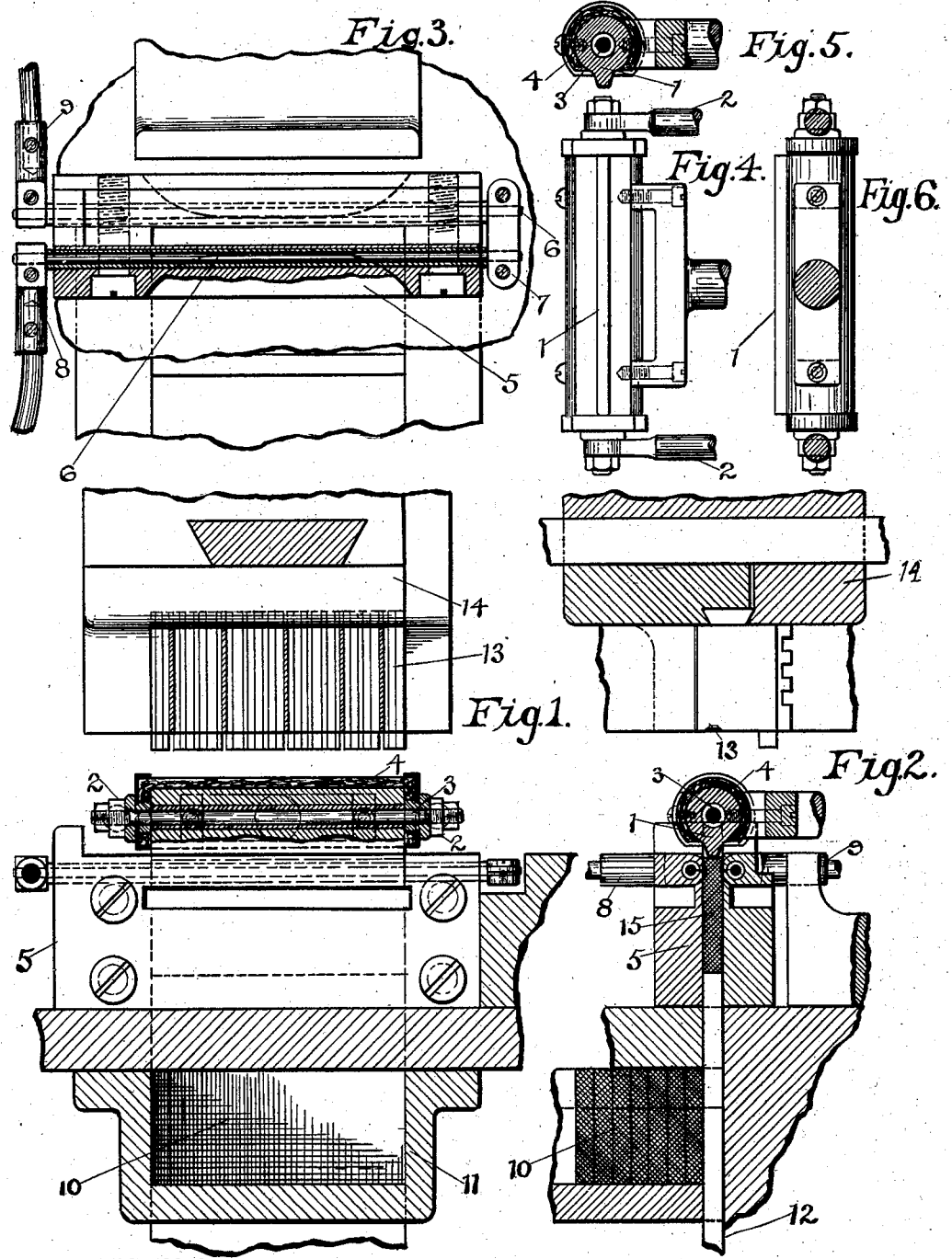
WITNESSES: INVENTOR
D. T. Davies Marcellus Reid
N. E. Merkel No. 721,389. PATENTED FEB. 24, 1903.
M. REID.
MACHINE FOR MAKING TYPE BARS.
APPLICATION FILED JAN. 28, 1898.
NO MODEL. 3 SHEETS—SHEET 2.
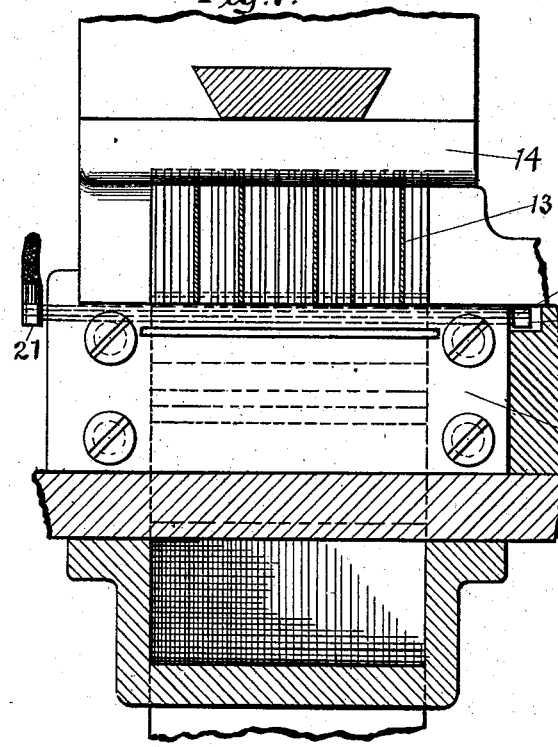
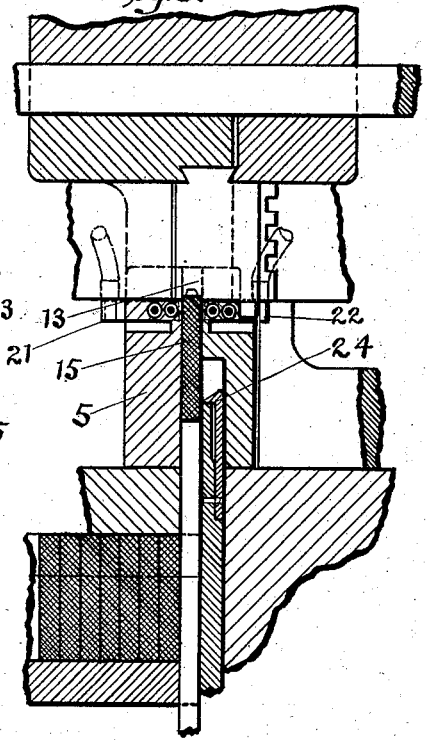
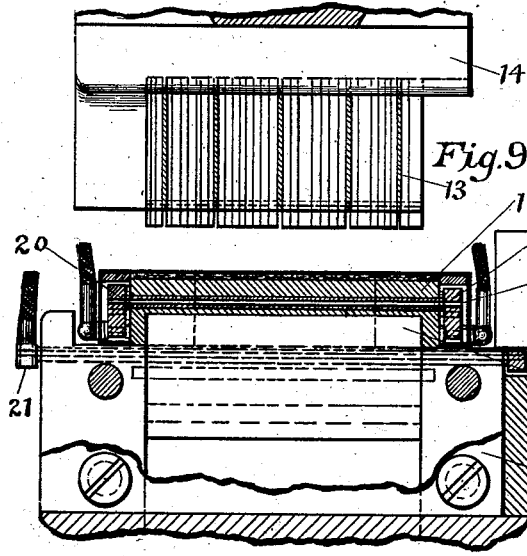
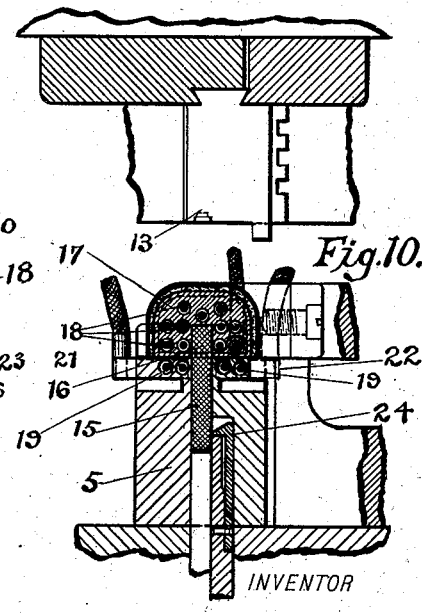
WITNESSES:
L. T. Davies.
N. E. Merkel.
INVENTOR
Marcellus Reid.

No. 721,389. PATENTED FEB. 24, 1903.
M. REID.
MACHINE FOR MAKING TYPE BARS.
APPLICATION FILED JAN. 28, 1898.
NO MODEL. 3 SHEETS—SHEET 3.

WITNESSES:
D. T. Davies
N. E. Merkel

INVENTOR
Marcellus Reid.

UNITED STATES PATENT OFFICE.

MARCELLUS REID, OF CLEVELAND, OHIO.

MACHINE FOR MAKING TYPE-BARS.

SPECIFICATION forming part of Letters Patent No. 721,389, dated February 24, 1903.

Application filed January 28, 1898. Serial No. 668,265. (No model.)

*To all whom it may concern:*

Be it known that I, MARCELLUS REID, a citizen of the United States, and a resident of Cleveland, county of Cuyahoga, and State of Ohio, have invented a new and useful Improvement in Machines for Making Type-Bars, of which the following is a specification, the principle of the invention being herein explained and the best mode in which I have contemplated applying that principle, so as to distinguish it from other inventions.

My invention relates to machines for producing type-bars; and it consists of means hereinafter fully described.

The annexed drawings and the following description set forth in detail certain mechanism embodying the invention, such disclosed means constituting but one of various mechanical forms in which the principle of the invention may be used.

Figure 11:
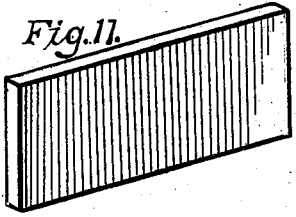
Figure 12:
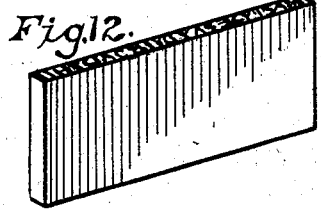
Figure 13:
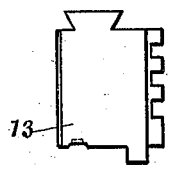
Figure 14:
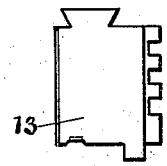
Figure 15:
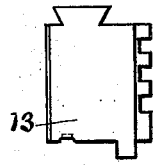
Figure 16:
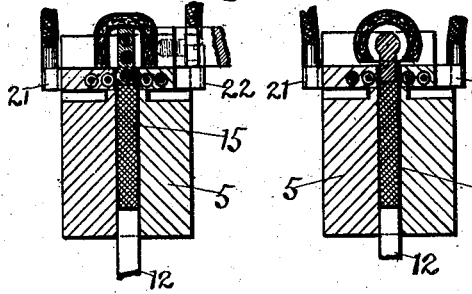
Figure 17:
Figure 18:
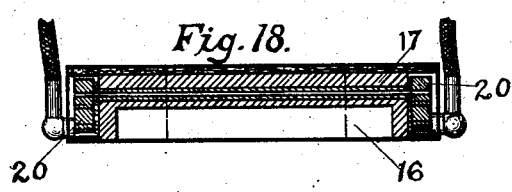

Referring to the drawings, Figure 1 represents a front view, partly in vertical longitudinal section and partly in elevation, of the heating mechanism and type-bar box of a type-bar-making machine embodying my invention, showing also above in elevation the portion of the mechanism embodying the matrix-holder with a line of matrices therein operating in connection with said above-described heating mechanism and type-bar box. Fig. 2 represents a vertical transverse section of said heating mechanism and matrix-holder. Fig. 3 represents a plan view of such heating mechanism. Figs. 4, 5, and 6 represent plan, side, and sectional views of an electrode. Figs. 7 and 8 represent a partly elevational and vertical longitudinal sectional view and a vertical transverse sectional view, respectively, of the matrix-holder, heating mechanism, and type-bar box, illustrating the respective positions of said holder and type-bar box when the matrices are being impressed upon the type-bar. Figs. 9 and 10 represent views similar to those illustrated by Figs. 1 and 2, showing, however, a modified form of electrode used for heating the blank type-bar edge. Fig. 11 represents a blank type-bar. Fig. 12 represents a finished type-bar. Figs. 13, 14, and 15 represent vertical sectional views of a line of matrices, a type-bar box, and an electrode. Figs. 16, 17, and 18 represent plan, longitudinal, and transverse sectional views of an electrode such as shown in Figs. 9 and 10. Figs. 19, 20, 21, 22, 23, 24, and 25 represent views showing three different styles of electrodes, each constructed so as to suit different kinds of electric currents.

In operation the electrode 1 is placed in an electric circuit connected by the terminals 2 to the resistance-bar 3, which is properly insulated from the electrode or heating-bar 1. The action of the electric current in the resistance-bar 3 is to heat the electrode 1, which is insulated to keep the heat in by the asbestos cover 4. In the top of the type-bar box 5 are placed two other resistance-bars 6, connected by the terminals 7, 8, and 9 in an electric circuit, either in parallel or series with the electrode resistance-bar 3 at the terminals 2, as the conditions may require. Blank type-bars 10 are fed in through the trough 11 and pushed up in the type-bar box 5 by the plunger 12. Brought into contact with the electrode 1 the heat from electrode 1 melts the edge of the type-bar, when the electrode is quickly moved out and the assembled line of female matrices 13, held in the matrix-holding head 14, is quickly brought down on the edge of the type-bar 15. A short movement of the plunger 12 upward will produce a finished type-bar, as shown in Fig. 12. The object of the resistance-bars 6 in the top of the type-bar box (shown more clearly in Fig. 2, where the upper part of the type-box is broken out) is to keep the melted edge of the type-bar from cooling too quickly, thereby allowing time to perform by mechanical means the several movements required to make from a blank bar a finished type-bar.

I have not shown in the drawings the mechanism to perform the several mechanical movements—such as feeding the blank bars in, moving the electrode in and out of position to do the heating, and raising and lowering the matrix-holding head—for the reason that it does not constitute a part of the invention, for any mechanism which would give the required movements in the required time would do the work.

Figs 7, 8, 9, and 10 show the same invention. The only difference is in the style of electrode used, in which the type-bar 15 is pushed up into the slot 16 of the electrode 17, which is heated by the resistance-bars 18.

The upper part of the type-bar box has resistance heating-bars 19, similar to those shown in Figs. 1, 2, and 3. In this case I have connected the bars in the electrode 17 in parallel by the terminals 20 and the bars in the type-bar box in series parallel by the terminals 21, 22, and 23. The connections may be changed at any time to suit whatever kind of an electric current is supplied.

Figure 22:
Figure 24:
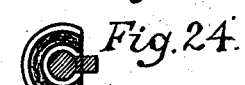
Figures 23, 25:
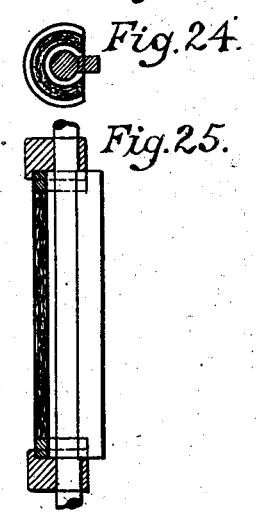

Fig. 13 shows the application of the electrode shown in Figs. 22 and 23. Fig. 14 shows the application of the electrode shown in Figs. 24 and 25, and Fig. 15 shows the application of the electrode shown in Figs. 19, 20, and 21.

In Figs. 15, 8, and 10 there is shown a hook 24, the object of which is to pull the type-bar down after being heated by the electrode 17.

Figure 19:
Figures 20, 21:
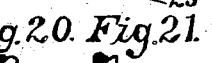

Figs. 19, 20, and 21 show an electrode in which there are no resistance-bars, as in Figs. 16, 17, and 18, Figs. 4, 5, and 6, and Figs. 22 and 23; but the current is passed directly through the slotted resistance-electrode 25. All of these electrodes are properly insulated to prevent the escape of heat as much as possible.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a machine for making type-bars, the combination of means for holding the blank bar, heating means for softening the edge of a bar while in said holder, an assembled line of matrices, means for impressing such matrix-line upon the edge of said bar, and auxiliary heating means for maintaining the plasticity of said bar edge.

2. In a machine for making type-bars, the combination of means for holding the blank bar, electric heating means for softening the bar edge, means for moving such heating means into and out of operative relation with said edge, an assembled line of matrices, means for impressing such matrix-line upon said edge, and auxiliary heating means for maintaining the plasticity of said edge during a period of inoperative relationship of said electric heating means and said bar edge.

3. In a machine for making type-bars, the combination of means for holding the blank bar, electric heating means for softening the bar edge, means for moving such heating means into and out of operative relation with said edge, an assembled line of matrices, means for impressing such matrix-line upon said edge, and auxiliary electric heating means for maintaining the plasticity of said edge during a period of inoperative relationship of said electric heating means and said bar edge.

Signed by me this 25th day of January, 1898.

MARCELLUS REID.

Attest:
D. T. DAVIES,
A. E. MERKEL.